United States Patent
Enomoto et al.

(10) Patent No.: US 8,008,391 B2
(45) Date of Patent: Aug. 30, 2011

(54) AQUEOUS PIGMENT DISPERSION AND AQUEOUS PIGMENT INK FOR INKJET RECORDING

(75) Inventors: Yuuya Enomoto, Kamisu (JP); Kengo Yasui, Kamisu (JP); Tadashi Matsumoto, Kamisu (JP); Kozue Sunouchi, Kamisu (JP)

(73) Assignee: DIC Corporation, Tokyo (JP)

( * ) Notice: Subject to any disclaimer, the term of this patent is extended or adjusted under 35 U.S.C. 154(b) by 0 days.

(21) Appl. No.: 12/734,694

(22) PCT Filed: Nov. 11, 2008

(86) PCT No.: PCT/JP2008/070448
§ 371 (c)(1),
(2), (4) Date: Sep. 29, 2010

(87) PCT Pub. No.: WO2009/066577
PCT Pub. Date: May 28, 2009

(65) Prior Publication Data
US 2011/0009554 A1  Jan. 13, 2011

(30) Foreign Application Priority Data
Nov. 20, 2007  (JP) ................................. 2007-300359

(51) Int. Cl.
*C08L 71/02*  (2006.01)
(52) U.S. Cl. ........................... 524/513; 524/500; 524/59
(58) Field of Classification Search .................. 524/500, 524/513, 59
See application file for complete search history.

(56) References Cited

U.S. PATENT DOCUMENTS

| 6,051,645 A | 4/2000 | Suzuki et al. |
|---|---|---|
| 2004/0242726 A1* | 12/2004 | Waki et al. ..................... 523/160 |
| 2006/0100306 A1 | 5/2006 | Yau et al. |
| 2008/0108746 A1 | 5/2008 | Waki et al. |

FOREIGN PATENT DOCUMENTS

| EP | 0 796 902 A2 * | 9/1997 |
|---|---|---|
| EP | 0796902 A2 | 9/1997 |
| JP | 3-43313 | 4/1987 |
| JP | 9-263724 A | 10/1997 |
| JP | 9-279072 A | 10/1997 |
| JP | 3649389 | 11/2000 |
| JP | 3915369 | 10/2001 |
| JP | 2004-027037 A | 1/2004 |
| JP | 2005-239947 A | 9/2005 |
| JP | 2007-119708 A | 5/2007 |
| WO | WO-03/097753 A1 | 11/2003 |
| WO | WO-2006/052706 A1 | 5/2006 |

OTHER PUBLICATIONS

International Search Report dated Dec. 9, 2008, issued on PCT/JP2008/070448.

* cited by examiner

*Primary Examiner* — Ling-Siu Choi
(74) *Attorney, Agent, or Firm* — Edwards Angell Palmer & Dodge LLP

(57) ABSTRACT

An aqueous pigment dispersion capable of easily preparing an aqueous pigment ink for inkjet recording, from which is obtained a colored image which is excellent in scratch fastness and excellent in properties on any recording media such as color development on plain papers and gloss on dedicated papers, is provided. An aqueous pigment dispersion containing carbon black or an organic pigment (P), a (meth)acrylic copolymer (A), a polyoxyethylene/polyoxypropylene block copolymer (B) represented by the following general formula (1), a polyether based polyurethane (C), a basic material and water, wherein a mass ratio of the total of nonvolatile contents of (A), (B) and (C) to (P), (A+B+C)/P, is from 0.3 to 1.6; and a mass ratio of A/(A+B+C) is from 0.05 to 0.45, is provided.

$$HO-(C_2H_4O)_a-(C_3H_6O)_b-(C_2H_4O)_c-H \quad \text{(General Formula 1)}$$

8 Claims, No Drawings

AQUEOUS PIGMENT DISPERSION AND AQUEOUS PIGMENT INK FOR INKJET RECORDING

TECHNICAL FIELD

The present invention relates to an aqueous ink for inkjet recording which is excellent in gloss and scratch fastness on inkjet-dedicated papers and high in color optical density on plain papers and to an aqueous pigment dispersion capable of easily preparing the subject ink.

BACKGROUND ART

In an inkjet recording method, following diffusion of printers or diversification of needs of a recording form in consumers, in recent years, not only general-purpose plain papers such as PPC papers mainly used for texts but recording media (dedicated papers) having an ink-receiving layer such as glossy papers for photography for the purpose of obtaining high-quality images on a par with silver halide prints have been used. Under these circumstances, aqueous inks to be used for inkjet recording are required to obtain excellent colored images on any recording media.

Furthermore, in pigment inks, scratch fastness of images is very important because a pigment and a medium are separated from each other on dedicated paper.

In order to satisfy such characteristics, there are known a method of adding a block copolymer of ethylene oxide and propylene oxide (see Patent Documents 1 and 2) in an ink; a method of adding an acrylic resin for the purpose of enhancing fixability in addition to a self-dispersion pigment and the subject block copolymer (Patent Documents 3 and 4); a method of dispersing a pigment with a styrene acrylic resin and adding a urethane resin (Patent Document 5); and the like.

However, when the subject block copolymer is merely added as disclosed in Patent Documents 1 and 2, there is involved a problem that in the case of using a pigment, dispersion becomes defective.

Also, the method of adding the subject block copolymer to a self-dispersion pigment and further adding an acrylic resin as disclosed in Patent Documents 3 and 4 involves a problem that though scratch fastness is excellent, color development on plain papers, an aspect of which is an advantage of the self-dispersion pigment, is impaired, and gloss on dedicated papers is insufficient.

The method of dispersing a pigment with a styrene acrylic resin and adding a urethane resin as disclosed in Patent Document 5 involves a problem that though scratch fastness is excellent, color development on plain papers and gloss on dedicated papers are not exceptionally excellent.

Patent Document 1: JP-B-3-43313
Patent Document 2: JP-A-2004-27037
Patent Document 3: Japanese Patent No. 3649389
Patent Document 4: Japanese Patent No. 3915369
Patent Document 5: JP-A-2007-119708

DISCLOSURE OF THE INVENTION

Problems that the Invention is to Solve

A problem that the present invention is to solve solves the foregoing problems, namely, the present invention provides an aqueous pigment ink for inkjet recording capable of obtaining a colored image which is excellent in scratch fastness and excellent in properties on any recording media such as color development on plain papers and gloss on dedicated papers and an aqueous pigment dispersion capable of easily preparing the subject ink.

Means for Solving the Problems

The present inventors made extensive and intensive investigations regarding an aqueous pigment dispersion capable of obtaining a colored image which is excellent in scratch fastness and excellent in properties on any recording media such as high color development on plain papers and high gloss on dedicated papers. As a result, it has been found that the foregoing problem is solved more favorably by incorporating a pigment, a (meth)acrylic copolymer, a polyoxyethylene/polypropylene block copolymer and a polyurethane, leading to accomplishment of the present invention.

That is, first of all, the present invention provides an aqueous pigment dispersion capable of easily preparing an aqueous pigment ink for inkjet recording, which contains carbon black or an organic pigment (P), a (meth)acrylic copolymer (A), a polyoxyethylene/polyoxypropylene block copolymer (B) represented by the following general formula (1), a polyether based polyurethane (C), a basic material and water, characterized in that a mass ratio of the total of nonvolatile contents of the (meth)acrylic copolymer (A), the polyoxyethylene/polyoxypropylene block copolymer (B) and the polyether based polyurethane (C) to the carbon black or organic pigment (P), (A+B+C)/P, is from 0.3 to 1.6; and that a mass ratio of the (meth)acrylic copolymer (A) to the total of non-volatile contents of the resin component, A/(A+B+C), is from 0.05 to 0.45.

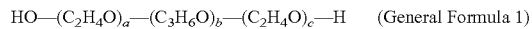

$$HO-(C_2H_4O)_a-(C_3H_6O)_b-(C_2H_4O)_c-H \quad \text{(General Formula 1)}$$

(In the formula, each of a, b and c represents an integer.)

Secondly, the present invention provides an aqueous pigment dispersion capable of easily preparing an aqueous pigment ink for inkjet recording, wherein the (meth)acrylic copolymer (A) which is one of the essential components is constituted of an aromatic monomer and a (meth)acrylic acid monomer and besides, a copolymerizable (meth)acrylic ester monomer and has an acid value of from 100 to 300 (mgKOH/g).

Thirdly, the present invention provides an aqueous pigment dispersion capable of easily preparing an aqueous pigment ink for inkjet recording, characterized in that in the polyoxyethylene/polyoxypropylene block copolymer (B) which is one of the essential components, a polyoxyethylene unit accounts for from 30 to 50% by mass, and a molecular weight of a polyoxypropylene unit is from 1,700 to 2,300.

Fourthly, the present invention provides an ink which is easily prepared from the foregoing aqueous pigment dispersion, namely, an aqueous pigment ink for inkjet recording, characterized by containing carbon black or an organic pigment (P), a (meth)acrylic copolymer (A), a polyoxyethylene/polypropylene block copolymer (B) represented by the foregoing general formula (1), a polyether based polyurethane (C), a basic material and water.

Advantages of the Invention

As described previously, it is possible to provide an aqueous pigment ink for inkjet capable of obtaining a colored image which is excellent in scratch fastness and excellent in properties on any recording media such as high color development on plain papers and high gloss on dedicated papers and an aqueous pigment dispersion capable of easily preparing the subject ink.

BEST MODES FOR CARRYING OUT THE INVENTION

Embodiments of the present invention are hereunder described in detail.

The present invention is concerned with an aqueous pigment ink for inkjet recording containing carbon black or an organic pigment (P), a (meth)acrylic copolymer (A), a polyoxyethylene/polypropylene block copolymer (B), a polyurethane (C), a basic material and water as essential components and an aqueous pigment dispersion capable of easily preparing the subject ink.

As the carbon black or organic pigment (P) which is used for the aqueous pigment dispersion of the present invention, all of known and customary carbon blacks or organic pigments can be used. Specific examples of the organic pigment include insoluble azo pigments, soluble azo pigments, indanthrene based pigments, phthalocyanine based pigments, quinacridone based pigments, perylene based pigments, isoindolinone based pigments, quinophthalone based pigments, anthraquinone based pigments, diketopyrrolopyrole based pigments and the like.

The (meth)acrylic copolymer (A) which is used for the aqueous pigment dispersion of the present invention is a copolymer of, as an essential component, a monomer in which an acid component thereof is a carboxyl group such as (meth)acrylic acid, namely, acrylic acid or methacrylic acid, with other copolymerizable monomer.

Examples of the copolymerizable monomer include methyl(meth)acrylate, ethyl(meth)acrylate, n-propyl(meth)acrylate, isopropyl(meth)acrylate, n-butyl(meth)acrylate, isobutyl(meth)acrylate, tert-butyl(meth)acrylate, 2-ethylhexyl (meth)acrylate, n-octyl(meth)acrylate, dodecyl(meth)acrylate[lauryl(meth)acrylate], octadecyl(meth)acrylate [stearyl(meth)acrylate], cyclohexyl(meth)acrylate, isobornyl (meth)acrylate, 2-hydroxyethyl(meth)acrylate, 2-hydroxypropyl(meth)acrylate, and alkoxy polyalkylene glycol mono(meth)acrylates such as methoxy polyethylene glycol mono(meth)acrylate and methoxy poly(oxyethylene-oxypropylene)glycol mono(meth)acrylate; and examples of the aromatic monomer include styrene based monomers such as styrene, α-methylstyrene, 4-methoxystyrene, tert-butylstyrene, chlorostyrene, etc. and aromatic ring-containing (meth)acrylic ester based monomers such as phenyl(meth) acrylate, benzyl(meth)acrylate, phenylethyl(meth)acrylate, phenylpropyl(meth)acrylate, phenoxyethyl(meth)acrylate, phenoxyethyl(meth)acrylate, etc.

In particular, when the (meth)acrylic copolymer (A) which is used in the present invention is a copolymer containing an aromatic monomer as a component, gloss of a colored image and effects such as an enhancement of storage stability of an ink, etc. can be expected.

In the present invention, on the assumption that the respective monomers to be used are substantially identical with respect to a degree of reaction or the like, a charge proportion of each monomer is considered to be a content proportion of a polymerization unit of each monomer as reduced into a mass. The copolymer which is used in the present invention can be synthesized by various reaction methods which have hitherto been known, such as block polymerization, solution polymerization, suspension polymerization, emulsion polymerization, etc. On that occasion, known and customary polymerization initiator, chain transfer agent, surfactant and antifoaming agent can also be used jointly.

In the (meth)acrylic copolymer (A) which is used for the aqueous pigment dispersion of the present invention, for example, its acid value is preferably from 100 to 300 (mgKOH/g); and from the standpoint that when dispersed in water, dispersibility or dispersion stability and gloss of an image are more excellent, the acid value is more preferably from 100 to 250 mgKOH/g. Furthermore, from the standpoint that gloss and scratch fastness are more excellent, the acid value is further preferably from 150 to 250 mgKOH/g; and from the standpoint that a colored image with high gloss is obtained, the acid value is ever further preferably from 200 to 250 mgKOH/g. The acid value as referred to herein means a milligram number of potassium hydroxide necessary for neutralizing 1 g of nonvolatile contents of the copolymer. A theoretical acid value can also be arithmetically determined on the basis of a use amount of used (meth)acrylic acid. In the case where the acid value is too low, dispersibility of the pigment is lowered, and therefore, such is not preferable. In the case where the acid value is too high, water resistance of a colored image is lowered, and therefore, such is not preferable, too. In order to make the copolymer have an acid value falling within the foregoing range, (meth)acrylic acid maybe copolymerized so as to have an acid value falling within the foregoing range.

The (meth)acrylic copolymer (A) which is used for the aqueous pigment dispersion of the present invention may be a binary copolymer, or may be a ternary or multi-component copolymer with other copolymerizable monomer or monomers.

The (meth)acrylic copolymer (A) which is used in the present invention may be a linear copolymer composed of only polymerization units of monomers, or may be a copolymer containing a partially crosslinked portion obtained by copolymerizing an extremely small amount of a crosslinking monomer of every kind.

Examples of such a crosslinking monomer include glycidyl(meth)acrylate, divinylbenzene and poly(meth)acrylates of polyhydric alcohols such as ethylene glycol di(meth) acrylate, propylene glycol di(meth)acrylate, polyethylene glycol di(meth)acrylate, poly(oxyethylene-oxypropylene) glycol di(meth)acrylate, a tri(meth)acrylate of an alkylene oxide adduct of glycerin, etc.

Though a molecular weight of the (meth) acrylic copolymer (A) which is used in the present invention is not particularly limited, for example, from the viewpoint of dispersion stability, it is preferably from 5,000 to 100,000 in terms of a weight average molecular weight. Above all, from the standpoints of low viscosity and easy handling, the molecular weight is more preferably from 5,000 to 40,000.

The polyoxyethylene/polyoxypropylene block copolymer (B) which is used for the aqueous pigment dispersion of the present invention has a structure represented by the following general formula (1).

$$\mathrm{HO-(C_2H_4O)}_a\mathrm{-(C_3H_6O)}_b\mathrm{-(C_2H_4O)}_c\mathrm{-H} \quad \text{(General Formula 1)}$$

In the formula, each of a, b and c represents an integer, and preferably an integer such that not only a polyoxyethylene unit accounts for from 30 to 50% by mass, but a molecular weight of a polyoxypropylene unit is from 1,700 to 2,300.

As the compound represented by the general formula (1), there are exemplified ADEKA PLURONIC L-64, P-65, P-75, P-84 and P-85, all of which are manufactured by Adeka Corporation, and the like, but it should not be construed that the present invention is limited thereto.

The polyurethane which is used for the aqueous pigment dispersion of the present invention is the polyether based polyurethane (C) and is one having essentially two or more urethane bonds in one molecule thereof.

In the polyether based polyurethane (C), a polyether segment thereof is not subjected to hydrolysis, and therefore, it has excellent characteristic features that scratch fastness of a colored image after hygrothermal history and gloss of the colored image are hardly lowered as compared with polyester based polyurethanes. In particular, a polyether based polyurethane containing a poly(oxytetramethylene) structure is preferable from the standpoint that such characteristic features are remarkable as compared with other polyether based polyurethanes.

The poly(oxytetramethylene) structure means a partial structure represented by the following general formula. Though a repeating unit number n of oxytetramethylene in the following general formula (2) is not particularly limited, it is from 2 to 50. This repeating unit number n is an average value. This repeating unit number n is preferably from 10 to 40 from the standpoint that a colored image which is excellent in scratch fastness and gloss is obtained.

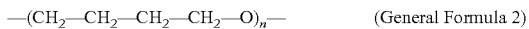  (General Formula 2)

The foregoing polyether based polyurethane (C) which is used for the aqueous pigment dispersion of the present invention can be, for example, obtained through a reaction using, as essential components, poly(oxytetramethylene)glycol, an organic diisocyanate compound and an active hydrogen compound containing an acid group and two active hydrogen atoms other than the acid group and optionally, an active hydrogen compound other than the foregoing active hydrogen compound. As a matter of course, the polyether based polyurethane (C) can also be produced by a method of producing a terminal isocyanate group-containing prepolymer and subjecting this to chain elongation.

The organic diisocyanate compound is not particularly limited, and examples thereof include aliphatic diisocyanate compounds such as hexamethylene diisocyanate, 2,2,4-trimethylhexamethylene diisocyanate, etc.; alicyclic diisocyanate compounds such as isophorone diisocyanate, hydrogenated xylylene diisocyanate, 4,4-cyclohexylmethane diisocyanate, etc.; aromatic aliphatic diisocyanate compounds such as xylylene diisocyanate, tetramethylxylylene diisocyanate, etc.; and aromatic diisocyanate compounds such as toluylene diisocyanate, phenylmethane diisocyanate, etc.

As the organic diisocyanate compound, aromatic or alicyclic diisocyanate compounds are preferable from the standpoint that the gloss of a colored image is higher.

The polyether based polyurethane (C) which is used for the aqueous pigment dispersion of the present invention further contains a free acid group in the molecule thereof. When the molecule of the polyurethane contains an acid group, solubility of the subject resin in an aqueous medium increases, and initial dispersibility or dispersion stability of the pigment is greatly enhanced due to the acid group in the resin. In order to introduce an acid group into the molecule of the polyurethane, it is preferable to use an active hydrogen compound containing an acid group and two active hydrogen atoms other than the acid group.

As such an active hydrogen compound, for example, an active hydrogen compound containing a carboxyl group and/or a sulfonic group as an acid group and containing two active hydrogen atoms other than the acid group can be used without particular limitations, and examples thereof include 2,2-dimethylollactic acid, 2,2-dimethylolpropionic acid, 2,2-dimethylolbutanoic acid, 2,2-dimethylolvaleric acid, 3,4-diaminobutanesulfonic acid, 3,6-diamino-2-toluenesulfonic acid and the like. A use amount of the active hydrogen compound containing an acid group and two active hydrogen atoms other than the acid group is an amount such that the acid value of the polyurethane falls within the foregoing range.

Examples of the active hydrogen compound which is optionally used for purpose other than the introduction of an acid group include low-molecular diols such as ethylene glycol, diethylene glycol, propylene glycol, dipropylene glycol, 1,2-propanediol, 1,3-propanediol, 1,4-propanediol, etc.

On that occasion, it is preferable to use jointly a low-molecular diol having a branched structure as the active hydrogen compound. When a polyaddition reaction structure between the low-molecular diol having a branched structure and the organic diisocyanate is introduced into the polyurethane resin, crystallinity is disturbed due to steric hindrance of a side chain, and therefore, initial dispersibility or dispersion stability of dispersed particles in the aqueous medium is enhanced. Examples of such a low-molecular diol having a branched structure include aliphatic diols such as neopentyl glycol, butylethylpropanediol, etc.

It is preferable that the polyether based polyurethane (C) which is used for the aqueous pigment dispersion of the present invention has an acid value of from 40 to 90 because during adding a basic material, initial dispersibility of the pigment into the aqueous medium or dispersion stability of the pigment in the aqueous medium is favorable; printing stability of the prepared aqueous pigment ink for inkjet recording is good; and image storage properties of a colored image, such as water resistance, scratch fastness, etc., are favorable.

The polyether based polyurethane (C) which is used for the aqueous pigment dispersion of the present invention has a weight average molecular weight of from 2,000 to 100,000, preferably from 3,000 to 50,000, and more preferably from 5,000 to 30,000.

The neutralized acid group in the (meth)acrylic copolymer (A) and the polyether based polyurethane (C) is usually set up within the range of from 30 to 100%, and especially preferably from 70 to 100%. This proportion of the ionized group does not mean a molar ratio of the acid group and the basic material but is one taking into consideration dissociation equilibrium.

As the basic material which neutralizes the (meth)acrylic copolymer (A) and the polyether based polyurethane (C), all of known and customary materials can be used, and for example, inorganic basic materials such as sodium hydroxide, potassium hydroxide and ammonia or organic basic materials such as triethylamine and alkanolamines can be used.

The aqueous pigment dispersion of the present invention is one containing these carbon black or organic pigment (P), (meth)acrylic copolymer (A), polyoxyethylene/polyoxypropylene block copolymer (B), polyether based polyurethane (C) and basic material in water. In the present invention, as water incorporated into the subject dispersion, for example, water having a pH of from 6.5 to 7.5 and not containing a free ion, such as distilled water, ion exchanged water, pure water, ultrapure water, etc., is preferable.

In the aqueous pigment dispersion of the present invention, a mass ratio of the total of nonvolatile contents of the (meth)acrylic copolymer (A), the polyoxyethylene/polyoxypropylene block copolymer (B) and the polyether based polyurethane (C) to the carbon black or organic pigment (P), (A+B+C)/P, is from 0.3 to 1.6, and a mass ratio of the (meth)acrylic copolymer (A) to the total of nonvolatile contents of the resin component, A/(A+B+C), is from 0.05 to 0.45. In the case where the (A+B+C)/P ratio is too low, scratch fastness of a colored image and storage stability of the aqueous ink itself are lowered, whereas in the case where it is too high, a viscosity of the aqueous ink becomes high so that a discharge characteristic thereof tends to be impaired, and therefore, such is not preferable. Preferably, (A+B+C)/P is from 0.3 to 1.2, and A/(A+B+C) is from 0.05 to 0.45. More preferably, (A+B+C)/P is from 0.3 to 1.0, and A/(A+B+C) is from 0.1 to 0.45. Further preferably, (A+B+C)/P is from 0.3 to 1.0, and A/(A+B+C) is from 0.15 to 0.45. Above all, preferably, it is the most preferable that (A+B+C)/P is from 0.3 to 1.0, and A/(A+B+C) is from 0.15 to 0.35; and that a mass ratio of the total of nonvolatile contents of the (meth)acrylic copolymer (A) and the polyether based polyurethane (C) to the carbon black or organic pigment (P), (A+C)/P is in the range of from 0.3 to 0.45.

For a method for producing the aqueous pigment dispersion of the present invention, a preliminary dispersion step, a dispersion step, a distillation step, an acid deposition step, a filtration step, a washing step, a redispersion step, a centrifugation step, a pH adjustment step and the like are enumerated as examples.

In the preliminary dispersion step, from the standpoint that the organic pigment surface strongly aggregated by drying is sufficiently wetted with a dispersion medium, thereby efficiently achieving dispersion, it is preferable to preliminarily mix the carbon black or organic pigment, the (meth)acrylic copolymer, the polyoxyethylene/polyoxypropylene block copolymer, the polyurethane, the basic material and water prior to dispersion by a dispersion machine.

In the preliminary dispersion step, it is preferable that coarse particles are crushed using, for example, a homodisper, an emulsifier, a line mixer, etc. from the standpoint that clogging of a separator for separating the slurry and the medium in the dispersion machine from each other can be avoided.

In the dispersion step, a step of dispersing a mixture of the carbon black or organic pigment (P), the (meth)acrylic copolymer (A), the polyoxyethylene/polyoxypropylene block copolymer (B), the polyether based polyurethane (C), the basic material and water is indispensably included. It is preferable to incorporate a water-soluble organic solvent into this mixture.

In the dispersion step, there maybe the case where when the water-soluble organic solvent is used jointly, a liquid viscosity in the dispersion step can be lowered. Examples of the water-soluble organic solvent include ketones such as acetone, methyl ethyl ketone, methyl butyl ketone, methyl isobutyl ketone, etc.; alcohols such as methanol, ethanol, 2-propanol, 2-methyl-1-propanol, 1-butanol, 2-methoxyethanol, etc.; ethers such as tetrahydrofuran, 1,4-dioxane, 1,2-dimethoxyethane, etc.; and amides such as dimethylformamide, N-methylpyrrolidone, etc. Such a water-soluble organic solvent may be used as a copolymer solution, or may be separately independently added in the dispersion mixture.

The dispersion machine which is used in the present invention is not particularly limited, and already known various dispersion machines can be used. For example, dispersion modes such as a mode utilizing kinetic energy of a spherical dispersion medium having a diameter of from about 0.1 to 1 mm and made of steel, stainless steel, zirconia, alumina, silicon nitride, glass or the like; a mode utilizing a shearing stress by mechanical stirring; a mode utilizing a force generated following a change in pressure, change in passage or collision of a flux of a dispersing material fed at a high speed; and the like can be adopted. Of these, a medium stirring type dispersion machine is preferable from the standpoint that it combines advantages of the foregoing mode.

Examples of the distillation step include a step in which in the case of using a water-soluble organic solvent in the dispersion step, this is removed; a step in which in order to attain a desired solids concentration, excessively water is removed; and the like.

In making the aqueous pigment dispersion display more excellent characteristics in all views of ultimate dispersion level, time required for dispersion and dispersion stability, it is preferable that the pigment particle and the copolymer interact more strongly with each other and are dispersed.

In order to enhance the interaction of the dispersed particles, it is preferable to incorporate a step of brining the pigment particle surface into intimate contact with the copolymer in a dissolved state as a post-step after the foregoing dispersion step.

As the step of bringing the copolymer in a dissolved state into intimate contact with the pigment particle surface, a step (acid deposition step) in which a liquid medium containing the pigment particles and the copolymer dissolved by a neutralizing base is acidified to return an ionic group in the copolymer to a state before being neutralized, thereby depositing the copolymer is preferable.

The acid deposition step is a step in which the aqueous pigment dispersion obtained through the foregoing dispersion step and the distillation step which is carried out, if desired is acidified by the addition of an acid material such as hydrochloric acid, sulfuric acid, acetic acid, etc. to form a salt together with the neutralizing base, thereby depositing the copolymer in a dissolved state on the pigment particle surface. According to this step, the interaction between the pigment and the copolymer can be enhanced. After filtering off the deposit thus obtained by enhancing the interaction, and preferably after further washing the deposit, the deposit is again dispersed in an aqueous medium together with a neutralizing base, whereby an aqueous pigment dispersion with more excellent dispersion stability can be formed.

The filtration step is a step of filtering off the deposit obtained by enhancing the interaction between the pigment particle surface and the copolymer. This deposit is a solid composed of the pigment particles and the copolymer. This step is a step of filtering the solid after the foregoing acid deposition step by a filter press, a Nutsche type filter, a pressure filter or the like.

The washing step is a step of washing and filtering the deposit filtered off in the foregoing filtration step, and by carrying out this step, it becomes possible to reduce or remove an inorganic salt contained in the ultimately obtained aqueous pigment dispersion.

In view of the fact that the inorganic salt contained in the organic pigment and an inorganic salt which has been contaminated due to other factor can be reduced or removed comprehensively in this washing step, there are brought advantages that it is not necessary to independently perform prior washing of the organic pigment itself and that the unit operations may be simple and easy. In particular, in the organic pigment, there is much room for contamination of inorganic salts in its raw material or steps such as reaction, microfabrication, etc. as compared with carbon black, and therefore, meaning in preparing the aqueous pigment dispersion through these washing and filtration steps is large.

Examples of the redispersion step include a step of adding the basic material and optionally, water and additives to the solid obtained by the acid deposition step and the filtration step, thereby again forming a dispersion. According to this, a counter ion of the ionized acid group of the copolymer can be changed from that used in the dispersion step.

The centrifugation step is a step of removing coarse particles in the dispersion, which adversely affect use adaptability as the aqueous pigment ink.

In the thus obtained aqueous dispersion, by incorporating various additives and liquid media which are known and customary in the technical field of aqueous inks for inkjet recording thereinto, an aqueous pigment ink for inkjet recording can be formed. Specifically, by diluting the aqueous pigment dispersion with water or other liquid medium such that the solids content of the pigment is from 1 to 10% on a mass basis, an aqueous pigment ink for inkjet recording can be formed. For the purposes of removing coarse particles or excessively small particles and adjusting particle size distribution of dispersed particles, ultracentrifugation or filtration by a microfilter may be further carried out.

The thus obtained aqueous pigment ink for inkjet recording is able to perform printing and recording on known and customary recording media. On that occasion, examples of the recording media include various films or sheets, for example, plain papers such as PPC papers; inkjet-dedicated papers such as photographic papers (glossy), photographic papers (silky-finished), etc.; synthetic resin films such as OHP films; metal foils such as aluminum foils; and the like.

EXAMPLES

The present invention is hereunder described in more detail by reference to the following Examples and Comparative Examples. In the following Examples and Comparative Examples, all "parts" and "%" are on a mass basis.

Synthesis Example 1

In a reactor of an automatic polymerization reaction apparatus (polymerization tester, DSL-2AS Model, manufactured by Todoroki Sangyo Co., Ltd.) having a reactor equipped with a stirrer, a dropping device, a temperature sensor and a reflux device having a nitrogen-introducing device in an upper part thereof, 550 parts of methyl ethyl ketone (MEK) was charged, and the inside of the reactor was purged with nitrogen while stirring. After raising the temperature to 80° C. while keeping the inside of the reactor under a nitrogen atmosphere, a mixed solution of 113 parts of benzyl methacrylate, 38 parts of 2-hydroxyethyl methacrylate, 84 parts of methacrylic acid, 250 parts of styrene, 15 parts of glycidyl methacrylate and 30.0 parts of "PERBUTYL (a registered trademark) O" (active ingredient: t-butyl peroxy 2-ethylhexanate, manufactured by NOF Corporation) was dropped from the dropping device over 4 hours. After completion of dropping, the reaction was further continued at the same temperature for 15 hours, and thereafter, a part of MEK was distilled off in vacuo to adjust a nonvolatile content at 50%, thereby obtaining an MEK solution of a methacrylic copolymer (M-1) having an acid value of 200.

Synthesis Example 2

An MEK solution of a methacrylic copolymer (M-2) having a nonvolatile content of 50% and an acid value of 150 was obtained in the same manner as in Synthesis Example 1, except for using 82 parts of benzyl methacrylate and 115 parts of methacrylic acid.

Synthesis Example 3

An MEK solution of a methacrylic copolymer (M-3) having a nonvolatile content of 50% and an acid value of 170 was obtained in the same manner as in Synthesis Example 1, except for using 67 parts of benzyl methacrylate and 130 parts of methacrylic acid.

Synthesis Example 4

An MEK solution of a methacrylic copolymer (M-4) having a nonvolatile content of 50% and an acid value of 200 was obtained in the same manner as in Synthesis Example 1, except for using 44 parts of benzyl methacrylate and 153 parts of methacrylic acid.

Synthesis Example 5

An MEK solution of a methacrylic copolymer (M-5) having a nonvolatile content of 50% and an acid value of 240 was obtained in the same manner as in Synthesis Example 1, except for using 13 parts of benzyl methacrylate and 184 parts of methacrylic acid.

Synthesis Example 6

An MEK solution of a methacrylic copolymer (M-6) having a nonvolatile content of 50% and an acid value of 300 was obtained in the same manner as in Synthesis Example 1, except for using 38 parts of 2-hydroxyethyl methacrylate, 230 parts of methacrylic acid, 217 parts of styrene and 15 parts of glycidyl methacrylate as all of the monomers.

Synthesis Example 7

An MEK solution of a methacrylic copolymer (M-7) having a nonvolatile content of 50% and an acid value of 200 was obtained in the same manner as in Synthesis Example 1, except for using 294 parts of n-butyl methacrylate in place of the whole of benzyl methacrylate and the whole of styrene.

Synthesis Example 8

480 parts of poly(oxytetramethylene) glycol having a number average molecular weight of 2,000 (n=27.5, PTMG2000), 282 parts of isophorone diisocyanate (IPDI) and 0.007 parts of dibutyltin dilaurate (DBTDL) were charged and allowed to react under a nitrogen atmosphere at 100° C. for one hour. Thereafter, the reaction mixture was cooled to 65° C.; 0.007 parts of dimethylolpropionic acid (DMPA), neopentyl glycol (NPG) and 448 parts of MEK were added; and the mixture was allowed to react at 80° C. for 16 hours. Thereafter, 408 parts of MEK and methanol were added to stop the reaction, thereby obtaining an MEK solution of a linear chain polyurethane (U-1) having a nonvolatile content of 50% and an acid value of 55.

Preparation Example 1

In a 3-liter stainless steel vessel, 1,000 g of the MEK solution of the polyurethane (U-1), 550 g of a 5% potassium hydroxide aqueous solution and 1,200 g of ion exchanged water were mixed; after stirring for one hour, the mixed solution was transferred into a 3-liter separable round bottom flask; and the whole of MEK and a part of water were distilled off. After cooling to room temperature, the resultant was subjected to concentration adjustment with ion exchanged water, thereby obtaining a polyurethane aqueous solution (u-1) having a solids content of 20%.

Example 1

In a mixing tank equipped with a cooling jacket, 250 parts of a copper phthalocyanine pigment (C.I. Blue 15:3), Fastogen Blue 5310SD (manufactured by DIC Corporation), 75 parts of the MEK solution of the methacrylic copolymer (M-1) obtained in Synthesis Example 1, 21 parts of a 20% potassium hydroxide aqueous solution, 87 parts of MEK, 50 parts of a polyoxyethylene/polyoxypropylene block copolymer (PLURONIC L-64, manufactured by Adeka Corporation; polyoxyethylene component: 40%, molecular weight of polyoxypropylene component: 1,750) and 923 parts of ion exchanged water were charged, followed by stirring and mixing for 2 hours by a disper (T. K. HOMODISPER 20 Model, manufactured by Primix Corporation). The obtained mixed solution was allowed to pass through a dispersion apparatus filled with zirconia beads having a diameter of 0.3 mm (SC Mill SC 100/32 Model, manufactured by Mitsui Mining Co., Ltd.) and dispersed for 4 hours by a circulation mode (a mode of returning the liquid dispersion having been discharged from the dispersion apparatus to the mixing tank). The liquid dispersion temperature was controlled at not higher than 40° C. by allowing cold water to pass through the cooling jacket during the dispersion step.

After completion of dispersion, a dispersion stock solution was extracted from the mixing tank, and subsequently, the mixing tank and a passage of the dispersion apparatus were washed with 2,000 parts of water, followed by combining with the dispersion stock solution to obtain a diluted liquid dispersion.

The diluted liquid dispersion was charged in a glass-made distillation apparatus, and the whole of methyl ethyl ketone and a part of water were distilled off. After allowing the residue to stand for cooling to room temperature, 10% hydrochloric acid was dropped while stirring, to adjust a pH at 4.5; and thereafter, the solid was filtered by a Nutsche type filter and washed with water. A wet cake was collected into a vessel; a 20% potassium hydroxide aqueous solution was added to adjust a pH at 9.5; 250 parts of the polyurethane aqueous solution (u-1) was added; and thereafter, the mixture was redispersed by the foregoing disper. Thereafter, the dispersion was allowed to go through a centrifugation step (6,000 G, 30 minutes), to which was further added ion exchanged water to adjust a nonvolatile content, thereby obtaining an aqueous pigment dispersion (D-1) having a nonvolatile content of 20% using a resin having an acid value of 110.

Example 2

An aqueous pigment dispersion (D-2) using a resin having an acid value of 150 was obtained in the same manner as in Example 1, except for using 75 parts of the MEK solution of the methacrylic copolymer (M-2), 28 parts of a 20% potassium hydroxide aqueous solution and 916 g of ion exchanged water.

Example 3

An aqueous pigment dispersion (D-3) using a resin having an acid value of 170 was obtained in the same manner as in Example 1, except for using 50 parts of the MEK solution of the methacrylic copolymer (M-3), 100 parts of MEK, 21 parts of a 20% potassium hydroxide aqueous solution and 933 g of ion exchanged water.

Example 4

An aqueous pigment dispersion (D-4) using a resin having an acid value of 200 was obtained in the same manner as in Example 1, except for using 50 parts of the MEK solution of the methacrylic copolymer (M-4), 100 parts of MEK, 25 parts of a 20% potassium hydroxide aqueous solution and 929 g of ion exchanged water.

Example 5

An aqueous pigment dispersion (D-5) using a resin having an acid value of 240 was obtained in the same manner as in Example 1, except for using 50 parts of the MEK solution of the methacrylic copolymer (M-5), 100 parts of MEK, 30 parts of a 20% potassium hydroxide aqueous solution and 924 g of ion exchanged water.

Example 6

An aqueous pigment dispersion (D-6) using a resin having an acid value of 300 was obtained in the same manner as in Example 1, except for using 50 parts of the MEK solution of the methacrylic copolymer (M-6), 100 parts of MEK, 38 parts of a 20% potassium hydroxide aqueous solution and 918 g of ion exchanged water.

Example 7

An aqueous pigment dispersion (D-7) using an aromatic free resin having an acid value of 200 was obtained in the same manner as in Example 4, except for using 50 parts of the MEK solution of the methacrylic copolymer (M-7) and 100 parts of MEK.

(Preparation of Aqueous Pigment Ink for Piezo-mode Inkjet Recording)

Aqueous pigment inks for piezo-mode inkjet recording were prepared using the aqueous pigment dispersions (D-1) to (D-7) of Examples 1 to 7 of the present invention, respectively while referring to Example 1 disclosed in JP-A-7-228808. An ink composition is shown below.

| (Ink composition) | |
|---|---|
| Aqueous pigment dispersion: | 4.0 parts as reduced into the pigment |
| Triethylene glycol monobutyl ether: | 10.0 parts |
| Diethylene glycol: | 15.0 parts |
| POLYFLOW KL-260 (manufactured by Kyoeisha Chemical Co., Ltd.): | 0.5 parts |
| SURFYNOL 465 (manufactured by Air Products and Chemicals, Inc.): | 0.8 parts |
| Water: | Balance |

(Print Evaluation of Aqueous Pigment Ink for Piezo-mode Inkjet Recording)

Each of the above-prepared aqueous pigment inks for inkjet recording was filled in a cartridge of a commercially available piezo-mode inkjet printer (PX A-550, manufactured by Seiko Epson Corporation) and printed on photographic paper ("glossy", manufactured by Seiko Epson Corporation) and plain paper (Xerox 4024) at a duty of 100%.

(Gloss Evaluation)

A 20° gloss value and a haze value of a patch at a duty of 100% on the photographic paper were measured using a BYK-Gardner's haze gloss meter and substituted into the expression disclosed in paragraph [0065] of JP-A-2006-8797 (Expression 1 (image clarity)=(20° gloss value)/(haze value)×100), thereby determining the image clarity. The larger the numerical value, the better the image clarity is.

(Color Development Evaluation on Plain Paper)

An optical reflection density (OD) of a patch printed at a duty of 100% on the plain paper was measured using a spectrophotometer, SpectroEye.

(Scratch Fastness Evaluation)

A print patch was printed at a duty of 100% on the photographic paper, and after elapsing one day, it was strongly rubbed by a finger, thereby determining image durability.

A: A mark does not leave at all.
B: A gloss of a scratch mark is observed.
C: Separation of colors is slightly observed.
D: Separation of colors is observed.
E: Complete separation of colors is observed, and the substrate is exposed.

Evaluation results of these Examples 1 to 7 are shown in summary in Table 1.

TABLE 1

| | Methacrylic copolymer | Acid value | Aromatic monomer | Gloss | Image clarity | OD | Scratch fastness |
|---|---|---|---|---|---|---|---|
| Example 1 | M-1 | 110 | Yes | 67.1 | 29.4 | 1.01 | C |
| Example 2 | M-2 | 150 | Yes | 72.1 | 32.6 | 1.01 | B |
| Example 3 | M-3 | 170 | Yes | 71.9 | 29.8 | 1.03 | B |
| Example 4 | M-4 | 200 | Yes | 73.8 | 31.1 | 1.04 | B |
| Example 5 | M-5 | 240 | Yes | 76.0 | 33.9 | 1.03 | B |
| Example 6 | M-6 | 300 | Yes | 60.7 | 24.7 | 1.02 | C |
| Example 7 | M-7 | 200 | No | 65.0 | 24.7 | 1.05 | B |

It is noted from Table 1 that the aqueous pigment ink for inkjet recording prepared from the pigment dispersion of the present invention is excellent in color development on plain paper and gloss on dedicated paper and combines favorable scratch fastness.

Comparative Example 1

An aqueous pigment dispersion (D-8) was obtained in the same manner as in Example 4, except that dispersion was carried out using, as components, only the pigment and the MEK solution of the (meth)acrylic copolymer (M-4) among the essential components set forth in claim 1; and that the polyurethane aqueous solution (u-1) was not added in the redispersion step.

Comparative Example 2

An aqueous pigment dispersion (D-9) was obtained in the same manner as in Example 4, except that dispersion was carried out using, as components, only the pigment and the polyoxyethylene/polyoxypropylene block copolymer (PLURONIC L-64, manufactured by Adeka Corporation) among the essential components set forth in claim 1; and that the polyurethane aqueous solution (u-1) was not added in the redispersion step.

Comparative Example 3

An aqueous pigment dispersion (D-10) was obtained in the same manner as in Example 4, except that the polyurethane aqueous solution (u-1) was not added in the redispersion step.

Comparative Example 4

An aqueous pigment dispersion (D-11) was obtained in the same manner as in Comparative Example 1, except that in Comparative Example 1, the polyurethane aqueous solution (u-1) was added in the redispersion step.

Comparative Example 5

An aqueous pigment dispersion (D-12) was obtained in the same manner as in Comparative Example 2, except that in Comparative Example 2, the polyurethane aqueous solution (u-1) was added in the redispersion step.

The presence or absence of the essential components and evaluation results of these Example 4 and Comparative Examples 1 to 5 are shown in summary in Table 2.

TABLE 2

| | Methacrylic copolymer (M-4) (acid value: 200) | Polyoxyethylene/ polyoxypropylene copolymer | Polyurethane | Gloss | Image clarity | OD | Scratch fastness |
|---|---|---|---|---|---|---|---|
| Example 4 | Yes | Yes | Yes | 73.8 | 31.11 | .04 | B |
| Comparative Example 1 | Yes | No | No | 21.0 | 12.0 | 1.03 | E |
| Comparative Example 2 | No | Yes | No | Inferior dispersion | | | |
| Comparative Example 3 | Yes | Yes | No | 37.5 | 22.2 | 1.05 | E |
| Comparative Example 4 | Yes | No | Yes | 16.1 | 8.0 | 1.04 | E |
| Comparative Example 5 | No | Yes | Yes | Inferior dispersion | | | |

It is noted from Table 2 that the aqueous pigment ink containing, as the major essential components of the aqueous pigment dispersion of the present invention, three kinds of the methacrylic copolymer, the polyoxyethylene/polyoxypropylene block copolymer and the polyurethane is excellent in color development on plain paper and gloss on dedicated paper and combines favorable scratch fastness as compared with that not containing anyone of these essential components.

Example 8

A pigment dispersion (D-13) was obtained in the same manner as in Example 4, except that in Example 4, the polyoxyethylene/polyoxypropylene block copolymer was replaced by PLURONIC P-84, manufactured by Adeka Corporation (polyoxyethylene component: 40%, molecular weight of polyoxypropylene component: 2,250).

Comparative Example 6

A pigment dispersion (D-14) was obtained in the same manner as in Example 4, except that in Example 4, the polyoxyethylene/polyoxypropylene block copolymer was replaced by PLURONIC 17R-4, manufactured by Adeka Corporation (represented by the following general formula (3): reverse block type centering on the polyethylene component as a molecule; polyoxyethylene component: 40%, molecular weight of polyoxypropylene component: 1,750).

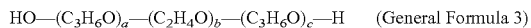  (General Formula 3)

Comparative Example 7

A pigment dispersion (D-15) was obtained in the same manner as in Example 4, except that in Example 4, the polyurethane was replaced by a polyester based polyurethane (a product name: HYDRAN AP-40F, manufactured by DIC Corporation).

Evaluation results of these Example 8 and Comparative Examples 6 and 7 are shown in summary in Table 3.

TABLE 3

| | Polyoxyethylene/ polyoxypropylene copolymer | Polyurethane | Gloss | Image clarity | OD | Scratch fastness |
|---|---|---|---|---|---|---|
| Example 4 | L-64 | Polyether | 73.8 | 31.1 | 1.04 | B |
| Example 8 | P-84 | Polyether | 76.5 | 38.6 | 1.05 | B |
| Comparative Example 6 | 17R-4 | Polyether | 8.8 | 11.7 | 0.98 | B |
| Comparative Example 7 | L-64 | Polyester | 49.8 | 25.9 | 1.05 | B |

It is noted from Table 3 that the aqueous pigment ink for inkjet recording in which a molecular structure of the polyoxyethylene/polyoxypropylene block copolymer is represented by the general formula (1), and the polyurethane is a polyether based polyurethane is excellent in color development on plain paper and gloss on dedicated paper and combines favorable scratch fastness.

Furthermore, in conformity with Example 3, influences of a mass ratio of the total of nonvolatile contents of the (meth), acrylic copolymer (A), the polyoxyethylene/polyoxypropylene block copolymer (B) and the polyether based polyurethane (C) to the carbon black or organic pigment (P), (A+B+C)/P and a mass ratio of the (meth)acrylic copolymer (A) to the total of nonvolatile contents of the resin component, A/(A+B+C) against the aqueous ink for inkjet recording were evaluated.

Example 9

A copper phthalocyanine pigment (C.I. Blue 15:3), Fastogen Blue 5310SD (P) was blended with the methacrylic copolymer (M-3) (A), the polyoxyethylene/polyoxypropylene block copolymer, L64R (B) and the polyether based polyurethane aqueous solution (u-1) (C) in nonvolatile contents of 0.15 for (A), 0.20 for (B) and 0.20 for (C), respectively. An aqueous pigment dispersion (D-16) using a resin having an acid value 170 was obtained in the same manner as in Example 3, except that the mass ratio of the total of nonvolatile contents of the (meth)acrylic copolymer (A), the polyoxyethylene/polyoxypropylene block copolymer (B) and the polyether based polyurethane (C) to the organic pigment (P), (A+B+C)/P was set up at 0.55; and that the mass ratio of the (meth)acrylic copolymer (A) to the total of nonvolatile contents of the resin component, A/(A+B+C) was set up at 0.27.

Example 10

An aqueous pigment dispersion (D-17) using a resin having an acid value of 170 was obtained in the same manner as Example 3, except that the nonvolatile contents were set up at 0.15 for (A), 0.30 for (B) and 0.30 for (C), respectively; that (A+B+C)/P was set up at 0.75; and that the mass ratio of the (meth)acrylic copolymer (A) to the total of nonvolatile contents of the resin component, A/(A+B+C) was set up at 0.20.

Example 11

An aqueous pigment dispersion (D-18) using a resin having an acid value of 170 was obtained in the same manner as Example 3, except that the nonvolatile contents were set up at 0.20 for (A), 0.20 for (B) and 0.20 for (C), respectively; that (A+B+C)/P was set up at 0.60; and that the mass ratio of the (meth)acrylic copolymer (A) to the total of nonvolatile contents of the resin component, A/(A+B+C) was set up at 0.33.

Example 12

An aqueous pigment dispersion (D-19) using a resin having an acid value of 170 was obtained in the same manner as Example 3, except that the nonvolatile contents were set up at 0.05 for (A), 0.50 for (B) and 0.50 for (C), respectively; that (A+B+C)/P was set up at 1.05; and that the mass ratio of the (meth)acrylic copolymer (A) to the total of nonvolatile contents of the resin component, A/(A+B+C) was set up at 0.05.

Example 13

An aqueous pigment dispersion (D-20) using a resin having an acid value of 170 was obtained in the same manner as Example 3, except that the nonvolatile contents were set up at 0.05 for (A), 0.23 for (B) and 0.23 for (C), respectively; that (A+B+C)/P was set up at 0.50; and that the mass ratio of the (meth)acrylic copolymer (A) to the total of nonvolatile contents of the resin component, A/(A+B+C) was set up at 0.10.

Example 14

An aqueous pigment dispersion (D-21) using a resin having an acid value of 170 was obtained in the same manner as Example 3, except that the nonvolatile contents were set up at 0.30 for (A), 1.00 for (B) and 0.30 for (C), respectively; that (A+B+C)/P was set up at 1.60; and that the mass ratio of the (meth)acrylic copolymer (A) to the total of nonvolatile contents of the resin component, A/(A+B+C) was set up at 0.19.

Example 15

An aqueous pigment dispersion (D-22) using a resin having an acid value of 170 was obtained in the same manner as Example 3, except that the nonvolatile contents were set up at 0.26 for (A), 0.64 for (B) and 0.30 for (C), respectively; that (A+B+C)/P was set up at 1.20; and that the mass ratio of the (meth)acrylic copolymer (A) to the total of nonvolatile contents of the resin component, A/(A+B+C) was set up at 0.22.

Example 16

An aqueous pigment dispersion (D-23) using a resin having an acid value of 170 was obtained in the same manner as Example 3, except that the nonvolatile contents were set up at 0.30 for (A), 0.30 for (B) and 0.20 for (C), respectively; that (A+B+C)/P was set up at 0.80; and that the mass ratio of the (meth)acrylic copolymer (A) to the total of nonvolatile contents of the resin component, A/(A+B+C) was set up at 0.38.

Example 17

An aqueous pigment dispersion (D-24) using a resin having an acid value of 170 was obtained in the same manner as Example 3, except that the nonvolatile contents were set up at 0.30 for (A), 0.20 for (B) and 0.20 for (C), respectively; that (A+B+C)/P was set up at 0.70; and that the mass ratio of the (meth)acrylic copolymer (A) to the total of nonvolatile contents of the resin component, A/(A+B+C) was set up at 0.43.

Comparative Example 8

An aqueous pigment dispersion (D-25) using a resin having an acid value of 170 was obtained in the same manner as Example 3, except that the nonvolatile contents were set up at 0.05 for (A), 0.10 for (B) and 0.10 for (C), respectively; that (A+B+C)/P was set up at 0.25; and that the mass ratio of the (meth)acrylic copolymer (A) to the total of nonvolatile contents of the resin component, A/(A+B+C) was set up at 0.20.

Comparative Example 9

An aqueous pigment dispersion (D-26) using a resin having an acid value of 170 was obtained in the same manner as Example 3, except that the nonvolatile contents were set up at 0.60 for (A), 0.05 for (B) and 0.05 for (C), respectively; that (A+B+C)/P was set up at 0.70; and that the mass ratio of the (meth)acrylic copolymer (A) to the total of nonvolatile contents of the resin component, A/(A+B+C) was set up at 0.86.

Comparative Example 10

An aqueous pigment dispersion (D-27) using a resin having an acid value of 170 was obtained in the same manner as Example 3, except that the nonvolatile contents were set up at 0.60 for (A), 0.50 for (B) and 0.52 for (C), respectively; that (A+B+C)/P was set up at 1.62; and that the mass ratio of the (meth)acrylic copolymer (A) to the total of nonvolatile contents of the resin component, A/(A+B+C) was set up at 0.37.

Evaluation results of these Examples 3 and 9 to 17 and Comparative Examples 8 to 10 are shown in Table 4.

TABLE 4

|  | (A + B + C)/P | A/(A + B + C) | (A + C)/P | Gloss | Image clarity | OD | Scratch Fastness | Ink filtration |
|---|---|---|---|---|---|---|---|---|
| Example 3 | 0.50 | 0.20 | 0.30 | 71.9 | 29.8 | 1.03 | B | ○ |
| Example 9 | 0.55 | 0.27 | 0.35 | 74.0 | 33.5 | 1.02 | B | ○ |
| Example 10 | 0.75 | 0.20 | 0.45 | 76.6 | 38.4 | 1.02 | B | ○ |
| Example 11 | 0.60 | 0.33 | 0.40 | 78.2 | 38.4 | 1.01 | B | ○ |
| Example 12 | 1.05 | 0.05 | 0.55 | 69.3 | 27.3 | 1.01 | B | Δ |
| Example 13 | 0.50 | 0.10 | 0.28 | 68.1 | 28.9 | 1.04 | C | ○ |
| Example 14 | 1.60 | 0.19 | 0.60 | 64.0 | 29.8 | 1.02 | B | Δ |
| Example 15 | 1.20 | 0.22 | 0.56 | 65.5 | 28.0 | 1.02 | B | Δ |
| Example 16 | 0.80 | 0.38 | 0.50 | 64.9 | 32.2 | 1.02 | B | ○ |
| Example 17 | 0.70 | 0.43 | 0.50 | 68.6 | 34.0 | 1.03 | B | ○ |
| Comparative Example 8 | 0.25 | 0.20 | 0.15 | 13.5 | 10.8 | 0.98 | E | ○ |
| Comparative Example 9 | 0.70 | 0.86 | 0.65 | 36.0 | 16.6 | 1.00 | D | Δ |
| Comparative Example 10 | 1.62 | 0.37 | 1.12 | — | — | — | — | x |

It is noted from the results shown in Table 4 that all of the aqueous pigment dispersions having a value of (A+B+C)/P falling within the range of from 0.3 to 1.6 and a value of A/(A+B+C) falling within the range of from 0.05 to 0.45 have a sufficient gloss value. Of these, the aqueous pigment dispersions having a value of (A+B+C)/P falling within the range of from 0.3 to 1.2 and a value of A/(A+B+C) falling within the range of from 0.05 to 0.45 are preferable because a low-viscosity ink is obtained.

Also, of these, the aqueous pigment dispersions having a value of (A+B+C)/P falling within the range of from 0.3 to 1.0 and a value of A/(A+B+C) falling within the range of from 0.1 to 0.45 are excellent in ink filtration properties. Furthermore, of these, the aqueous pigment dispersions having a value of (A+B+C)/P falling within the range of from 0.3 to 1.0 and a value of A/(A+B+C) falling within the range of from 0.15 to 0.45 are excellent in scratch fastness.

In particular, the aqueous pigment dispersions having a value of (A+B+C)/P falling within the range of from 0.3 to 1.0, a value of A/(A+B+C) falling within the range of from 0.15 to 0.35 and a value of (A+C)/P falling within the range of from 0.3 to 0.45 attain high gloss and are excellent in storage stability.

INDUSTRIAL APPLICABILITY

The aqueous ink for inkjet recording prepared from the aqueous pigment dispersion of the present invention is excellent in gloss on dedicated papers and color development on plain papers and also combines scratch fastness. The aqueous ink for inkjet recording of the present invention can be suitably used as inks for various printers and plotters, and especially, it can be suitably used as an aqueous ink for inkjet recording while applying its excellent characteristics.

The invention claimed is:

1. An aqueous pigment dispersion containing carbon black or an organic pigment (P), a (meth)acrylic copolymer (A), a polyoxyethylene/polyoxypropylene block copolymer (B) represented by the following general formula (1), a polyether based polyurethane (C), a basic material and water, wherein a mass ratio of the total of nonvolatile contents of the (meth)acrylic copolymer (A), the polyoxyethylene/polyoxypropylene block copolymer (B) and the polyether based polyurethane (C) to the carbon black or organic pigment (P), (A+B+C)/P, is from 0.3 to 1.6; and that a mass ratio of the (meth)acrylic copolymer (A) to the total of nonvolatile contents of the resin component, A/(A+B+C), is from 0.05 to 0.45:

     (General Formula 1)

wherein
each of a, b and c represents an integer.

2. The aqueous pigment dispersion according to claim 1, wherein the (meth)acrylic copolymer is constituted of an aromatic monomer and a (meth)acrylic acid monomer and besides, a copolymerizable (meth)acrylic ester monomer and has an acid value of from 100 to 300 (mgKOH/g).

3. The aqueous pigment dispersion according to claim 1, wherein a molecular weight of a polyoxypropylene unit of the polyoxyethylene/polyoxypropylene block copolymer is from 1,700 to 2,300.

4. The aqueous pigment dispersion according to claim 2, wherein a molecular weight of a polyoxypropylene unit of the polyoxyethylene/polyoxypropylene block copolymer is from 1,700 to 2,300.

5. An aqueous pigment ink for inkjet recording, characterized by being prepared from the aqueous pigment dispersion according to claim 1.

6. An aqueous pigment ink for inkjet recording, characterized by being prepared from the aqueous pigment dispersion according to claim 2.

7. An aqueous pigment ink for inkjet recording, characterized by being prepared from the aqueous pigment dispersion according to claim 3.

8. An aqueous pigment ink for inkjet recording, characterized by being prepared from the aqueous pigment dispersion according to claim 4.

* * * * *